I. H. ALLFREE.
ROTARY DIAMOND-HOLDERS FOR SAWS.
No. 185,204. Patented Dec. 12, 1876.
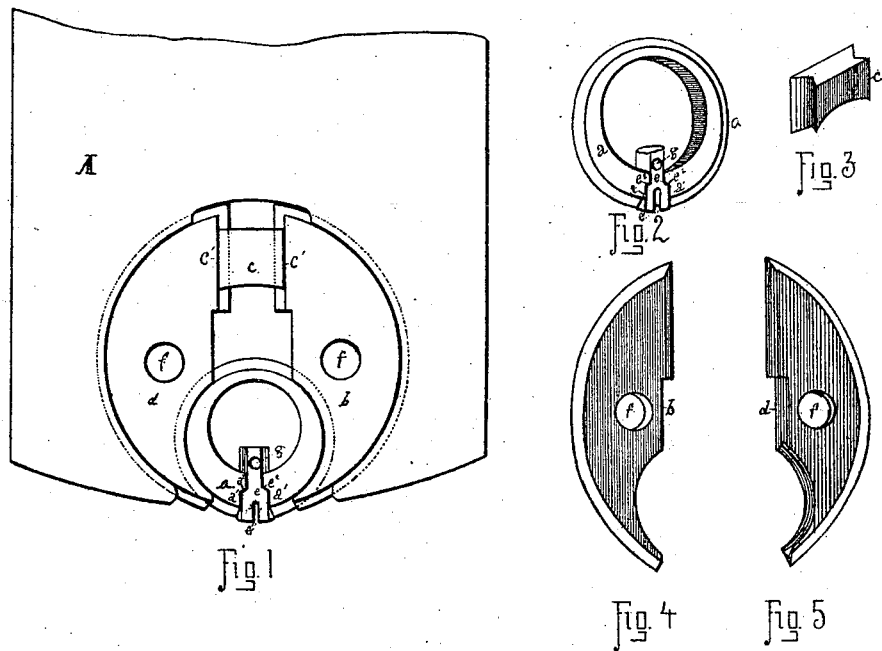

UNITED STATES PATENT OFFICE.

ISAAC H. ALLFREE, OF RICE'S LANDING, PENNSYLVANIA.

IMPROVEMENT IN ROTARY DIAMOND-HOLDERS FOR SAWS.

Specification forming part of Letters Patent No. 185,204, dated December 12, 1876; application filed June 10, 1876.

*To all whom it may concern:*

Be it known that I, ISAAC H. ALLFREE, of Rice's Landing, Green county, Pennsylvania, have invented a new and useful Improvement in Rotary Diamond-Holders for Saws, of which the following is a specification:

The accompanying drawing and description set forth what I consider the best means of carrying out my invention; and I do hereby declare that the following is a full, clear, and exact description thereof, reference being had to the accompanying drawings, forming a part of this specification.

The object of my invention is to insert in a saw-blade for sawing stone or other hard substances a rotary eccentric adjustable diamond-holder; and it consists in the combination of a cylindrical-shaped holder with a ring-shaped spring terminating in jaws, two semicircular-shaped jaws, a grooved wedge, and a grooved circular opening in the saw-blade, in which opening is inserted the semicircular-shaped jaws.

A circular grooved opening is made eccentrically toward the cutting-edge of the saw within the jaws, into which opening is inserted a ring-shaped spring, terminating in double-acting jaws, in which jaws a cylindrical-shaped diamond holder or seat is inserted, and held firmly in the position desired by a grooved wedge driven between the semicircular jaws at the opposite ends of the same from the diamond-seat. The diamond tooth is presented to its work at any desired angle by revolving the circular-shaped spring within the semicircular-shaped jaws upward, or lowering the same, and, in like manner, the cutting-edge of the tooth is presented to its work by revolving the diamond holder or seat, so as to control the lead of the saw in the desired direction.

In the accompanying drawings, Figure 1 represents a section of a saw-plate with my diamond-tooth-holding device inserted; Fig. 2, a perspective view of the spring-jaws with the diamond-seat inserted; Fig. 3, a perspective view of the wedge, and Figs. 4 and 5 perspective views of the semicircular jaws.

A is a section of a saw-plate having a circular opening, with a V-shaped groove within the periphery of the circle, in which groove is fitted, by a V-shaped rib, the adjustable double-acting semicircular-shaped jaws $b$ and $d$, and, in like manner, is inserted within said jaws the ring-shaped spring $a$, having the jaws $a'$ $a'$, in which jaws is inserted the cylindrical diamond holder or seat $e$, having the opening $e^1$ to admit the diamond. The diamond holder or seat $e$ is made with the shoulders $e^2$ $e^2$, fitting in corresponding shoulders in the jaws $a'$ $a'$, to prevent the same from being forced out backward by pressure on the diamond when the saw is at its work. Inserted between the jaws $b$ and $d$, and held in place by a V-shaped groove and corresponding rib on the saw-plate at $c'$ $c'$, is a wedge, $c$.

It will be seen that by driving the wedge $c$ backwardly from the cutting-edge of the saw the jaws $b$ $d$ will be forced apart at their lower ends, and will be made to tighten at their upper ends upon the ring-shaped spring $a$, and by forcing together the jaws $a'$ $a'$ upon the diamond holder or seat $e$ will hold it firmly in place.

The holes $ff$ in the jaws $b$ and $d$ are for the purpose of inserting a forked wrench for adjusting the jaws in reference to the cutting-edge of the saw and the jaws $a'$ $a'$ upon the ring-shaped spring, and, in like manner, a wrench is fitted in the opening or inner periphery of the ring-shaped spring for adjusting the tooth and presenting it to its work at any desired angle.

The hole $g$ in the diamond-seat $e$ is for the purpose of inserting a tool for turning and adjusting said seat within the periphery of its circle, for the purpose of presenting the cutting-edge of the diamond tooth in the desired position for controlling the lead of the saw.

It will be seen that by raising and lowering the jaws $b$ and $d$ above and below the center of the opening in the cutting-edge of the saw the points of the diamond tooth will be made to recede from said edge, and, in like manner, by the raising and lowering of the jaws $a'$ $a'$ of the ring-shaped spring $a$, the diamond tooth is brought to the desired angle in relation to its work, and the tooth adjusted longitudinally by an eccentric movement.

Having thus described my invention, what I claim is—

1. The double-acting adjustable semicircular jaws $b$ and $d$, wedge $c$, adjustable ring-shaped spring *a*, having jaws *a' a'*, and adjustable cylindrical-shaped diamond-seat *e*, when placed within the blade of a saw, for adjusting, clamping, and holding a saw-tooth, constructed substantially as described.

2. The combination of the jaws *a' a'* with the cylindrical-shaped diamond-seat *e*, for adjusting and holding the tooth of a saw, substantially as described.

3. The combination of the double-acting adjustable semicircular jaws *b* and *d* with the wedge *c*, in a saw-plate, for clamping and holding a tooth at the angle desired, substantially as described.

4. The combination of the jaws *b* and *d*, wedge *c*, ring-shaped spring *a*, having jaws *a' a'*, and diamond-seat *e*, with a saw-plate, all combined and arranged substantially as and for the purpose set forth.

ISAAC H. ALLFREE.

Witnesses:
JOHN H. STEVENSON,
T. T. MOORE.